: 3,454,429
METHOD OF GENERATING ELECTRICITY IN TAPE TYPE FUEL CELL
Bernard A. Gruber, Boxford, Mass., assignor to Monsanto Research Corporation, St. Louis, Mo., a corporation of Delaware
Continuation-in-part of application Ser. No. 232,144, Oct. 22, 1962. This application Mar. 29, 1966, Ser. No. 538,248
The portion of the term of the patent subsequent to July 12, 1983, has been disclaimed
Int. Cl. H01m 27/02
U.S. Cl. 136—86           9 Claims This application is a continuation-in-part of my copending application Ser. No. 232,144, filed Oct. 22, 1962, now U.S. Patent 3,260,620.

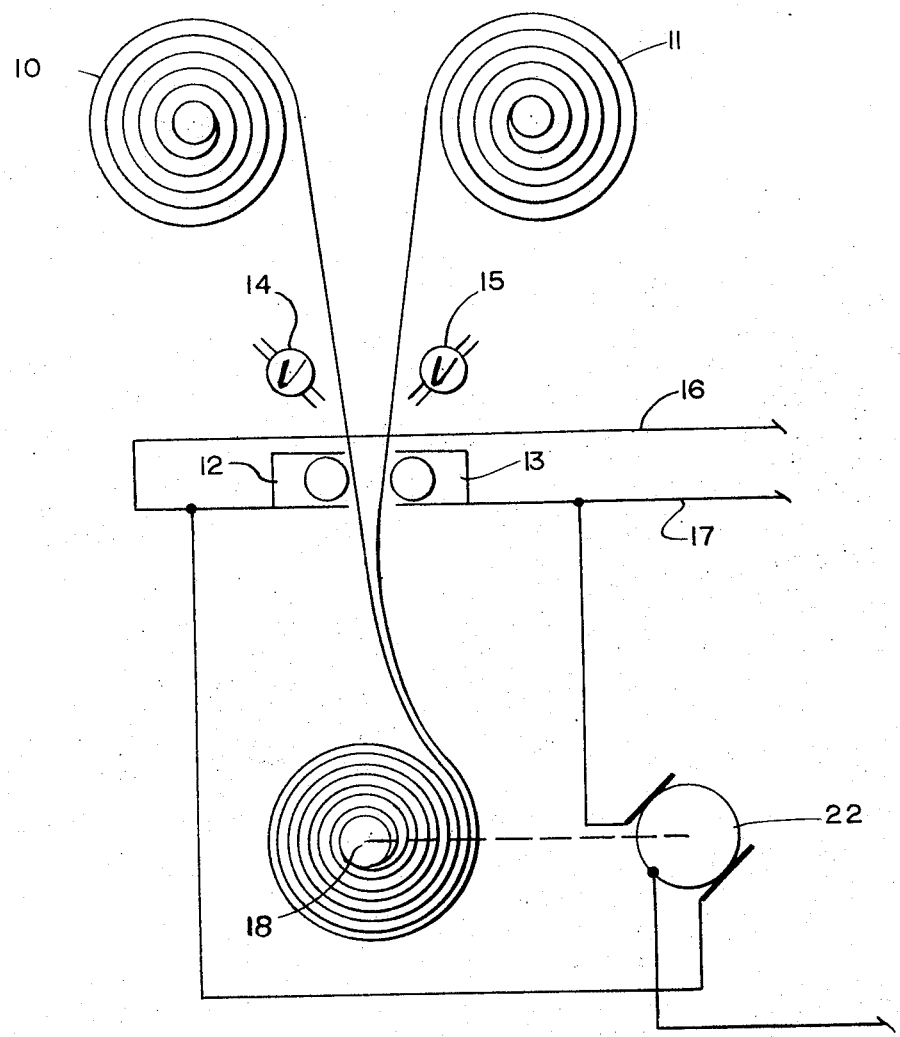

This invention relates to tape cells, and more particularly, provides a tape electrochemical amplifier.

A tape cell, as provided by my above-identified copending application, is a fuel cell in which an oxidant and a fuel are supplied to the active electrode sites, and the electrolytic connection between the current collectors is made by a separator which moves past the active electrode sites. The theory of a fuel cell is that the cell will continue to deliver electricity for so long as the reactants are supplied to the cell and reaction products removed so as to obtain a substantially invariant system. The electrode separator of a fuel cell is a part which has conventionally been designed for static operation. By provision of a separator which moves past the active electrode sites in a fuel cell, it is found that considerable advantages can be obtained, as set forth hereinafter.

The separator can be moved past the active electrode sites by manually pulling it, by mechanically driving it with a device such as a key-wound spring, or by electric power. Only a fraction of the tape power output, such as 5% or less, is needed to power an electric motor to move the tape. When this power to move the tape is supplied from the tape cell power output, the cell acts as an electrochemical amplifier. The fraction of the tape power output powering the motor drives the tape in the cell to produce a larger total cell power output.

The features of the present invention will be readily understood by reference to the attached drawing which illustrates a simplified arrangement of apparatus suitable for practicing the present invention. Referring now to the drawing there is shown a fuel cell with a moving electrode separator tape in accordance with this invention. In the drawing, 10 and 11 are rolls of separator tapes following a path past electrode feed source valve outlets 14 and 15, between electrodes 12 and 13 provided respectively with leads 16 and 17 to wind together in a roll on spindle 18 which is rotated by motor 22.

In a further embodiment of this invention, the power to move the tape separator is supplied, initially or entirely, by a source of electricity other than the tape cell. Tape cells, which supply power on demand to the extent and only to the extent required, are advantageously used in remote locations, such as in satellites and in observation stations. Equipment used in such locations, to sense environmental data, for example, may convert sensory input into an electrical pulse for transmission of the data as a radio wave. If the pulse is weak, it may be insufficient to transmit the radio waves over the required distance.

By using this pulse to power a tape cell drive, however, the power is amplified, to the extent the tape power output is greater than the power needed to move the tape in the cell.

If the drive-powering equipment produces electrical pulses of meaningfully varied duration, the tape cell can reflect this in intermittent operation. The tape will be moved by the motor driven by the equipment while the pulses last, and will stop when the pulses stop, and the cell will produce power only while the tape is moving.

It is also possible for the tape cell to reflect varying intensities of power pulses. The rate of movement of a tape separator past active electrode sites affects the voltage of the cell at constant current. The more rapid the movement, the higher will be the voltage. Thus if a variable speed motor powers the tape drive, and its speed is proportional to the strength of the pulse which powers it, the output of the tape cell can be a function, not only of the duration, but also of the intensity of the pulse produced by the equipment, in amplified form.

In still a further embodiment of this invention, a separately produced power pulse can be used to start a tape cell, which is thereafter powered to move the tape in the cell by part of the cell power output. The cell will then act to amplify the initial, relatively weak and short power pulse into a greater power output of longer duration.

In its broadest embodiment, the tape cell of this invention is a fuel cell in which the electrolytic connection between the current collectors is made through a separator which moves past the active electrode sites.

In a preferred embodiment, the tape cell is a fuel cell in which the electrolytic connection between the current collectors is made through a separator which moves past the active electrode sites and which separator acts as a carrier for at least one of the fuel cell electrochemical reaction components.

In a still more preferred embodiment of the invention, the tape cell is a fuel cell in which the electrolytic connection between current collectors is made through a separator which moves past the active electrode sites and which is a dry tape carrier of a fuel cell electrochemical reaction component.

What is meant herein by the active electrode site is the site of the introduction or withdrawal of electrons to or from the electrolyte. The term electrode is sometimes given this restrictive meaning, but is generally used to designate, broadly, a device for the accomplishment of this result. Most of the electrode, in this broader sense of the term, is a current collector, with the function of conducting electrons to or from the site of their exchange with the electrolyte.

In fuel cells employing moving separators, as will become evident hereinafter, the functions of current collector and producing exchange of electrons with the electrolyte may require distinction, in some cases. For the purposes of discussion, the portion of the electrode actively participating in the electro/electrolyte exchange may be identified as the active electrode, and the remainder of the conductive material, as passive electrode. The active electrode material may actually be carried to the site of the electrochemical reaction by the separator, as will be seen from the following discussion, whereby it becomes the active electrode when the separator contacts the current collector and provides the electrolytic path between the active electrode sites.

This tape may be arranged so that after passage between electrodes, it exits from the electrochemical zone to be treated as cell operational waste. An advantage of this arrangement is that the tape separator between the fuel cell electrodes can be made of inexpensive porous material, which will permit ion transfer while preventing direct mixing of the fuel and oxidant reactants. Porous separators with pores of sufficient size to permit physical transport of chemical molecules eventually permit the reactants to diffuse through and mix. But if the porous separator is continually moved away from the electrode zone to which the reactants are fed, before the reactants have travelled completely through the separator, then this mixing of the reactants is prevented.

Moreover, this invention can advantageously be applied in a fuel cell including highly reactive materials, such as a cell using nitric acid, as an oxidant-electrolyte. By employing a disposable separator, so that before attack of the fuel cell reactant on the separator has proceeded far enough for the separator to fail, the portion of the separator exposed to this reactant has been moved away and out of the cell, the problem of separator failure is alleviated.

When the separator is made of an ion exchange material, such that molecular transport through the film is not possible, if desired, an arrangement may be made to cycle the tape within the cell, rather than discard a portion. Advantages can still be gain by using a mobile separator in design of the cell.

A significant factor in preventing optimum performance of fuel cells is polarization. The polarization can be shown to be made up of several different components, one of which is concentration polarization. Concentration polarization produces mass transfer limitations on the performance of the electrodes. A finite amount of time is required for the reactants to reach active sites at the electrode where they can undergo the electrochemical reaction (oxidation or reduction) and to be removed from such active sites, leaving the sites available for further reactant to occupy them.

In the first place, the movement of the separator to and away from the electrodes can assist in conducting this process of reactant transfer. The process of diffusion is supplemented by a physical transporting action. The tape can pick up intermediate or ultimate reaction products and assist in conveying them away from the electrode, as it cycles in the cell.

Even more effectively, the electrodes can be arranged to rotate while the moving separator runs between them. Thus for example the friction of the separator moving between the electrodes, set under proper tension, can cause appropriately mounted electrodes to rotate so that the point at which the electrodes contact each other is continually changing. This means that the active portion of the electrode is continually being moved away from the electrochemical reaction site, and allowed to rest (depolarize) until the rotating movement has carried it back to the electrochemical site. It is known that polarization decreases and eventually disappears when an electrode is out of operation. In accordance with the present invention, with the active portion of rotating electrodes continually changing, the remainder of the electrode is continually being held out of operation, thus alleviating polarization.

The tape will advantageously serve as a carrier for one or more of the fuel cell components. For example, while the electrode separator must prevent the direct mixing of the fuel being supplied to the anode and the oxidant being supplied to the cathode in a fuel cell, to provide the necessary electrical connection between the two electrodes, an electrolytically conductive medium must permeate the separator. To accomplish this, the moving tape separator may be routed through a bath of electrolyte during its travel path to the electrode sites at which the fuel and oxidant are supplied. Then as the fuel contacts the anode in the presence of the electrolyte on one side of the separator, and the oxidant contacts the cathode in the presence of the electrolyte on the opposite side of the separator, they can each undergo their respective electrochemical reactions while the electrolyte-impregnated separator provides the conductive path between the electrodes.

Various electrochemical systems have been devised in which a single liquid can serve the function of fuel and electrolyte, and another single liquid can serve the function of oxidant and electrolyte. For example, the fuel-electrolyte solution may be an aqueous solution of methanol as the fuel and potassium hydroxide as the electrolyte. The oxidant-electrolyte liquid feed may be an aqueous solution of hydrogen peroxide. Where the anode and the cathode feeds are each liquids, a double tape system may be used. One tape may be run through the solution of fuel and electrolyte. The other tape may be run through the oxidant-electrolyte solution. The tapes may then be routed to come together in a face to face relationship at the point of entry into the space between the electrodes, where the electrochemical reactions at the anode and cathode take place.

Using the tape as a carrier of electrochemical reaction components may be combined with gaining the above discussed advantages of a moving tape separator arrangement. Thus, use may be made of reactants which attack usual membrane separators on standing when a permanent, stationary membrane is employed. A rotating electrode system may be set up, whereby the segments of the electrode, after acting as the electrochemical reaction site, are rotated away from this site and allowed to rest so that polarization falls off before this electrode position is rotated back to participate in the electrochemical reaction.

Moreover, sometimes further particular advantages can be gained by employing the tape separator as a carrier of the electrochemical reaction components. Thus, it is sometimes desirable to use an electrolyte which is chemically corrosive to the electrode material. An example of this is the fuel cell system employing magnesium as a consumable anode material. Ammonium bromide has certain advantages over magnesium bromide as the electrolyte solute in such systems, but the magnesium salt is the material of choice nevertheless, because ammonium bromide is chemically corrosive to the metal. The corrosion losses during the electrochemical reaction are not important, but the losses of the metal due to the corrosion reaction during storage of it in contact with the ammonium electrolyte are too high to be tolerated. Now if the electrolyte solution is conveyed to the electrode only during the period that the cell is being required to deliver energy, the more active ammonium bromide electrolyte can be tolerated, and thus substituted for the magnesium bromide electrolyte.

The losses of electrode metal due to chemical corrosion can, if desired, be still further minimized by employing an arrangement wherein the tape is a carrier of the active electrode material. Thus for example, a tape may be coated with magnesium, which is carried by the tape to the current collectors where the tape coating acts as the active electrode. When the cell is to be used to generate current, the tape will go through a path in which it is wet by an ammonium bromide elecrolyte, from which it will proceed to complete the electrical circuit between the current collectors, then acting as the active electrode. When the cell is out of operation, the magnesium will not be in contact with the chemically corrosive ammonium bromide solution, and thereby corrosion losses are obviated.

Still another carrier aspect of the tape separator of this invention can be action in the removal of waste products from the cell. For example, the above-discussed magnesium electrode operates by discharging magnesium ion into a neutral or alkaline aqueous electrolyte solution, where the magnesium picks up hydroxide ions to form a precipitate of magnesium hydroxide.. When no provision is made for the removal of this material, accumulation of the precipitate may choke the cell. To the extent that byproducts and waste products are continually drawn from the fuel cell operating chamber as they are generated, improvements in fuel cell operations can be obtained. This removal can be effected by the frictional action of the movement of the tape itself. It may also be accomplished by this movement in conjunction with other arrangments as discussed above: for example, use of rotating electrodes, which can be combined if desired with a doctor blade scraping the electrodes as they rotate.

Dry tape carriers of fuel cell reactants offer still further advantages. In this embodiment of the present invention, the tape separator carriers one or more components of the fuel cell to the electrochemical reaction site in the form of a coating on the tape. The presence of free liquid in the cell can be completely eliminated, to achieve the advantages of a dry cell, which operates independently of gravity or of the position of the cell.

Thus, fluid materials can be applied to the tape separator as a coating of rupturable capsules. These may, for example, be what may be termed macrocapsules. If two tapes are sealed together around the periphrey of defined areas, the space between can be a liquid trap. For example, the two tapes can be sealed down the sides and sealed across in stripes at intervals down their lengths. The open spaces between the sealed parts can then serve as liquid containers. The tape can be cycled past sharp points or the like which rupture the capsules before they get to the electrodes. Two such tapes, or a coating on either side of one tape, can supply the anode and the cathode feeds respectively.

Conveniently, in a more sophisticated system, the electrochemical reaction components can be coated on the tape in the form of pressure-rupturable microcapsules. Encapsulation techniques produce minute droplets of liquid encased in a coating of film-forming materials such as polymers, which can be applied to a substrate such as paper to produce an adherent coating thereon. Thus fluid fuel-electrolyte and oxidant-electrolyte systems can be encapsulated and applied to opposite sides of a porous tape separator. Passage of the tape between closely spaced electrodes can exert sufficient pressure on it to rupture the capsules and thus release the reactants, as well as electrolyte.

Not only may the electrolyte, fuel and oxidant components of a fuel cell system be supplied to the electrodes by a moving tape system, but indeed, what may be regarded as the electrode itself may be provided by the tape.

Magnesium consumable anodes are mentioned above. A magnesium coating may readily be applied to one side of a separator tape, producing a laminated tape on which the magnesium is supplied as fuel to the electrochemical site. The other side of the tape may also be provided with a dry coating of oxidant-electrolyte solution enclosed in rupturable capsules, as discussed above, or if desired, the tape may be cycled to be wet by such a solution as a free liquid before the tape proceeds to the electrochemical reaction site.

When a laminate of the stated nature is used, the device at the anode site in the cell need be no more than a current collector. For example, it can be simply an electrically conductive contact, made of carbon, copper or the like, able to pick up and conduct away the electrons as they are released by solution of the metal in the electrolyte.

Similarly, a cathodic current collector, made of conductive materials as described such as carbon, may be used in conjunction with a tape carrying an active cathode material such as silver (II) oxide, wet for example with aqueous KOH as electrolyte, and if desired, laminated to a coating of zinc on the reverse side, to act as an active anodic material, whereby the device at the anode site may also be merely a current collector as above described.

An active anode material such as a metal like magnesium or zinc, and an active cathode material such as silver (II) oxide, function respectively as a fuel and as an oxidant, as well as functioning as active electrode materials. They are thus consumable electrode materials.

The tape carrier approach is not limited to consumable electrodes, either. While cathode and anode materials such as carbon and noble metals may be referred to as "inert," thte nature of the electrode is recognized to have a definite, pronounced effect on the facility with which electrochemical reactions proceed. Factors involved in this may include catalytic activity of the electrode material in promoting the electrochemical reaction, effect of porosity in providing reaction sites and so forth. One of the factors involved in polarization of electrodes (decline in potential developed by the cell) seems to be an effect of saturation of active sites.

Active electrode materials such as platinum can be applied to tapes in very thin coatings by methods such as sputtering. An active electrode material such as conductive carbon black can be coated on the tape. The tape can thus carry a continuously fresh electrode surface to the electrochemical reaction site. As a result, the limits on the rate at which an electrode can deliver current by lack of sufficiently rapidly available reaction sites can be avoided. Again, here, the device at the reaction site can be merely a current collector, with the tape carrying the active electrode surface to it.

Indeed, as will be readily evident from the foregoing, the moving separator tape can be advantageously carry every active component of the fuel cell, including fuel, oxidant, electrolyte fluid and on top of this, the active electrode surfaces (including catalyst), all in one package.

In employing the above described embodiments of the tape cell in accordance with the present invention, the drive by which the tape is moved past the active electrode sites will be connected to a source of electrical power.

On the one hand, this may be drawn from the electrodes or current collectors past which the tape separators move. To initiate movement of the tape in such case, a separate power source will be required. This initiating power source can advantageously be a source of electrical power, which is also connected to the electrical motor serving as the drive for moving the tape during operation of the cell. It can be activated automatically, by means such as inertia on impact activating a deferred action battery in a rocket or other landing equipment. Alternatively, it can be activated by remote control, on receipt of a radio wave, for example.

Alternatively, the tape drive motor can be driven by a separate power source, by which the tape separator is moved and the cell operated to produce a power output. This can be any one of various devices which produce an electrical power output. Thus, for example, it may be a photovoltaic device such as a solar cell, which converts a light input into electrical power. It may be a photoelectric device, in which interruption of a beam of light produces a change in a steady-state condition. The device producing the pulse powering the tape cell drive can alternatively be one converting heat or pressure into electrical power. Thus, for example, it may be a thermoelectric cell, in which production of a temperature difference between the hot and cold junctions of thermocouples produces electrical power. It may be a piezoelectric device, such as is used in accelerometers, wherein pressure applied to a crystal produces an electrical power output. Various such devices, which convert different kinds of energy input into electrical power, are known in the art. Suitable arrangements can be made so that the tape power output is a direct, inverse or other function of the power output driving it.

As will be understood, the power supplied to the motor driving the tape in the cell and the motor itself will be suitably matched so as to meet the demands of the system. For example, with two parallel tapes carrying magnesium, potassium periodate and an acid electrolyte, which will supply 4 volts and 8 watts of power, a motor can be employed operating at 4 volts and 52 milliamperes. A DC permanent magnet gear motor of these characteristics is available, operating at 1/19 r.p.m. and developing a torque of 150 oz.-in. This motor can effectively power a capstan drive, advancing the tapes at constant speed. If variable speed of the tape is required, such that the tape voltage varies depending on the power input to the motor, a suitable variable speed motor will be chosen, and so forth.

Referring now in further detail to the embodiments of the invention, a fuel cell with a moving electrode separator tape in accordance with this invention can comprise two facing rolls of separator tapes, following a path past electrode feed source valve outlets, meeting between electrodes provided respectively with leads. The tapes wind up together in a roll on a spindle. At the anode, which may be a graphite bar, for example, the valve leads to a source of fuel and anolyte, such as a solution of 5 molar hydrazine in 1 molar aqueous KOH, fed to wet one tape through a valved outlet. This tape wets the anode. The cathode, which is a graphite bar, for example, is wet by way of the second tape through a valved outlet by a source of oxidant/catholyte such as aqueous 5 molar hydrogen peroxide.

In an experimental embodiment of a fuel cell constructed in accordance with this system, the solutions of hydrazine and hydrogen peroxide described above were employed to wet the exterior faces of tapes, which were rolls of paper. Provision was made to wet the contacting faces of the paper rolls with 1 molar sodium hydroxide, above the point that the two rolls of paper were pressed in face to face relationship between the electrodes, which were of graphite. The electrodes were connected to an external circuit, and the tapes drawn between the electrodes while the voltage developed at a given current drain was measured. At a current drain of 20 milliamperes, the cell voltage was 0.03 volt and at a current drain of 5 milliamperes, the cell voltage was 0.3 volt.

The cross-section of this cell can be that of wide continuous tapes, passing over long continuous electrodes, or both can be sectional, with the electrodes connected in series or in parallel. The fuel cell designs in which rows of electrodes are stacked in packs of flat plates, with opposing faces the anode and cathode, can also readily be adapted to form a battery of cells like that described, and the tape can run through the cells in a single plane, or wind in and out around multiple electrodes. Other modifications can be made also: for example, instead of two tapes, a single tape can be wet on one side with the anolyte feed and on the other side with the catholyte feed. The valved feed outlets can be eliminated in cells using a tape carrying a dry coating of encapsulated feed, and so forth.

In an embodiment of the invention using cycling tape belts, the moving tape separators are endless belts of an ion exchange, semipermeable membrane such as cellophane, passing around the anode and cathode, and around respective feed rollers. The anode and cathode are also roller-shaped, and are carbon rods, the anode being suitably surfaced with electrolytically active material such as platinum. Shafts which are the axes of the anode and the cathode act as leads for connection of the cell to an external circuit. The electrodes are rotatably mounted on the shafts passing through their axes. Means are provided for rotating one or both of the feed rollers on their axes, such as motor drives connected to the ends of shafts running through their axes. If only one feed roller is driven rotatively, the other is mounted rotatably on its shaft, and friction of the tapes transmits the drive to it, so that it also rotates. The rotating drive causes the belt separators to cycle around their respective roller electrodes and feed rollers. The anode tape feed roller is immersed in a bath of a solution of a soluble fuel such as hydrazine and an electrolyte such as potassium hydroxide, in aqueous solution. The cathode tape feed roller is immersed in a solution of a soluble oxidant such as a solution of hydrogen peroxide in 14 molar sulfuric acid. Thus as the tape belts are rotated into the respective fuel solution and oxidant solution, they pick up these fuel cell reactants and carry them to the electrodes. The electrochemically active portion of the electrodes is the point on the circumference which is in electrochemical contact through the separators with the other electrode. Rotation of the electrodes causes this active electrode site to change continuously, whereby the electrode sites which have become polarized while acting as the active electrode are enabled to become depolarized before rotation back to the active electrode site. The moving tape belts, which can advantageously be one-sided Moebius strips, present a continuously changing surface to the electrode face, and continuously feed fresh reactant to the electrodes while driving them.

In a fuel cell construction in accordance with the invention with another rotating electrode construction, a moving separator tape, made of paper for example, passes between two sets of concentric hollow tubes. The exterior concentric tubes are electrodes, and made of suitable electrode material such as platinized carbon and carbon respectively. Each exterior tube is positioned as a slip ring on interior tubes. The interior tubes, which may be steel pipes, for example, are each fixed in position, and the hollow interiors of these tubes are connected respectively to reservoirs of anode feed supply such as aqueous methanol in KOH and cathode feed supply such as hydrogen peroxide—or gases, such as hydrogen and fluorine. The interior tubes are each penetrated by perforations, so their feed supply can exit to contact the surrounding slip ring tubes, which in turn are each provided with means for exit of liquids or gases through their circumferences, such as pores or perforations. The tape is in frictional contact with the exterior tubes. Brush current collectors and leads provide external circuit connections. To operate this cell, the leads are connected to an external circuit, anode and cathode feeds are supplied in the hollow interiors of the internal tubes and the tape is drawn, by means such as a motor-driven capstan drive, down between the exterior electrode tubes. The frictional relation of the tape to the exterior tubes causes them to rotate on interior tubes. The active electrode site on the exterior electrode tubes then continually changes. The sites becoming polarized by participation in the electrochemical reaction at the contact point of the tape with the exterior tubes are thus rotated away and have an opportunity to become depolarized before returning to the active electrode site.

In still another embodiment of the invention, the cathode is a copper band rotatably mounted on rollers which, when it touches the tape separator, is contacted by an electrolyte solution in which copper oxide is reduced to metallic copper, such as aqueous ammonium bromide. As the rotating action of the electrode brings the point of contact away from the tape, if any residual electrolyte is left on the surface, it is wiped away, as for example by a brush. The freshly reduced copper surface now comes into contact with air, which will oxidize it again to copper oxide. When the copper oxide is being reduced to copper by contact with the electrolyte, it will withdraw electrons from the electrolyte solution, and act as the cathode. This embodiment of the invention accordingly employs oxygen of the air as the cathode feed. The anode feed may be any desired material such as, for example, a sputtered coating of magnesium on the other side of the tape. By passing the tape into contact with aqueous ammonium bromide solution, for example, by feeding it under a roller in a bath of the stated solution, only just before the tape brushes against the rotating copper cathode, the magnesium is caused to go into solution in the ammonium bromide electrolyte and accordingly give up electrons to the current collector contacting the tape at the opposite face from that contacting the rotating copper electrode. Thus the point where this current collector contacts the magnesium tape coating will be the active anode site, on connection of the current collector and the rotating copper tube into an external circuit while the tape is fed between them generates power.

This arrangement also illustrates means which may be employed for minimizing current density at the active electrode site, employing an electrode rotating so that continually changing sites on the electrode participate in the electrochemical reaction while the remainder of the electrode device is enabled to depolarize. If the electrodes are rollers, and electrical contact where they touch is limited to a line contact, the consequences may be an unduly high current density at the active electrode site and lack of opportunity for the reactants to be fully consumed before being conveyed away from the electrochemical reaction site. The embodiment using a rotating band provides elongated surfaces for the current collector and for the copper band, which are in electrolytic contact through the electrolyte-wetted tape base and the layer of magnesium on the tape base. This provides an enlarged surface area for the electrode sites with lowered current density as compared to line contact of a roller electrode, and a chance for all the copper oxide on the band and magnesium on the tape to be consumed before the tape exits from between the band and the current collector. The stated results, of lowering current density over the active electrode surface and providing a prolonged active electrode site for completion of the electrochemical consumption of reactants, can also if desired be achieved by other means which will be readily apparent to those skilled in the art: for example, flat plate current collectors can be provided, which press against the two opposite faces of the tape after it exits from between rollers and act as current collectors over the path during which the tape carries residual reactant capable of undergoing the electrochemical reaction.

In still another embodiment of the invention, a tape base, wet with electrolyte such as aqueous ammonium bromide, passes under a magnesium roller which presses the tape reverse side carrying a coating of m-dinitrobenzene against a current collector. The magnesium roller is mounted on a shaft on which it rotates, whereby the point on the magnesium surface which is the active electrode site continually changes as the tape separator moves past the roller. The part of the roller touching the moving tape is the active electrode site; the rest of the roller is passive anode. A doctor blade scrapes magnesium hydroxide off the roller surface as it rotates past it, keeping the surface clean. When the current collector and magnesium roller are connected by conductors to an external circuit, and the tape moved between them, power is generated.

A tape which may be employed in accordance with the invention for a dry tape feed comprises a base, permeable to electrolyte, made of a bibulous material such as paper or the like. Adhered to the base is a closed cell foam. In this foam, cells are defined by walls, which completely enclose interior spaces which are filled with an electrochemically active gas such as fluorine. The closed cell foamed polymeric coating on the tape may be formed for example, by blowing fluorine into an inert polymer such as polyethylene, at a temperature sufficient to soften it, and then cooling to harden. The layer on the other side of the tape base is a series of rupturable capsules enclosed by walls made of solid polymeric material such as polyethylene, for example, enclosing fluid electrolyte. Portions of the tape base are left uncoated, which will be available to access of the contents of the layers on each side upon their rupture.

In another such tape, a bibulous base material such as paper is coated with a consumable anode material such as a sputtered magnesium coating. A layer of capsules is adhered to the opposite surface of the tape. The outer capsule surface may be made of a flexible, rupturable material such as polyvinyl chloride. The space inside the capsules contains a fluid oxidant-electrolyte solution such as an aqueous suspension of dinitrobenzene. Puncturing or crushing the frangible capsules releases the oxidant-electrolyte solution to wet the surface of the paper tape.

Materials which can be used as the tape separator materials include cellulosic materials, which may be matted or felted sheets of cellulosic fiber such as paper. Other cellulose materials and derivatives may also be employed as the tape base. For example, cellulose esters such as cellulose acetate, cellulose acetate propionate and cellulose acetate butyrate, and cellulose ethers such as ethyl cellulose can be formed into films useful as the tape base. The tapes may also be made of semipermeable, substantially homogeneous organic sheet material comprising regenerated cellulose. For example, this may be cellophane. The tape base may also comprise hydrophilic cellulosic derivatives such as methyl cellulose, carboxymethyl cellulose, hydroxyethyl cellulose, and the like, particularly as coatings or impregnants, for example, of alpha cellulose fibers.

It may sometimes be advantageous to employ, as a substrate, various other materials in the preparation of the base of the tape. The tape base may thus, if desired, comprise felts of fibers resistant to heat and to chemicals such as silicon carbide and asbestos, glass or the like. Woven constructions, comprising cloth such as woven cotton, rayon, wool, and synthetic fibers such as the acrylic polymer fibers can also be used.

A particularly advantageous tape comprises a permeable non-woven, alkali-resistant synthetic polymer base.

The tape separator must be permeable, having void spaces through which liquid can travel from face to face, to permit electrolytic contact between the anode and cathode, through absorption of the electrolyte in the separator. If it is so permeable that particles of fuel or oxidant can drop through it, this reactant will react at the opposite electrode and thus be lost to the electrochemical energy-producing reaction. The fuels and oxidants coated on the tape may have a very small particle size. If the tape is not permeable enough to let the electrolyte penetrate through it thoroughly, the internal resistance of the cell increases, and it is not possible to discharge the cell at a high rate. If the tape surface is not smooth, the electrodes do not contact it evenly over its entire surface, with consequent loss of capacity.

It is found that a permeable non-woven material, and particularly, a non-woven fibrous fabric material is an especially advantageous material for the tape base. While a woven fabric base has an irregular surface, preventing complete physical contact with flat electrode plates, and generally has a sufficiently open weave to permit particles to penetrate through it, non-woven materials can be obtained with flat, quite smooth surfaces, coupled with substantial permeability to liquids, without having large enough holes in their structures to permit particles to fall through. For example, such non-woven fibrous fabric materials can be obtained by compressing and heating a mat of polymeric fibers; while an adhesive, such as polyvinyl alcohol, for example, may be used as a binder in preparing such fibrous fabrics, particularly with thermoplastic fiber materials, the use of a binder is not necessary. In general, such non-woven fibrous fabric materials are free of the direct open void spaces extending from face to face which are characteristic of woven fabrics, and yet have substantial permeability to liquids. Permeable materials such as porous plastic films may also be used as tape bases, but at the small pore size preventing penetration by particles, these generally do not permit sufficiently thorough penetration by the electrolyte, resulting in limiting the cell to low discharge rates. On the other hand, non-woven fibrous fabric materials provide an advantageously suitable intermediate permeability, coupled with a smooth surface face, permitting penetration by liquid electrolyte while limiting penetration by particles.

The base is desirably a material resistant to attack by the electrolyte employed in the cell. Strong alkali solutions attack cellulosic materials, and accordingly, a preferred material for the tape base may be one inert to the action of aqueous alkali, such as an inert synthetic polymer, and particularly, a fiber-forming alkali-resistant synthetic polymer. A variety of alkali-resistant film- and fiber-forming polymeric materials are known which may be used in this connection, including for example a nylon (polyhexamethylene adipamide, polycaprolactam, polyhexamethylene sebacamide or the like), a hydrocarbon polymer such as polypropylene, an ester such as polyethylene terephthalate, a nitrile polymer such as polyacrylonitrile, and so forth.

The materials resistant to alkali attack, such as nylon and polypropylene, are also generally more resistant to oxidation than the cellulosics. As is known, cellulosics like paper can be attacked by strongly basic or acidic reactants, which leads to loss of the active material during coating, and weakens the base material.

The tape base can also comprise an ion exchange membrane, comprising as the active species a synthetic resin provided with functional groups, which are acid groups for cationic permeability and hydroxy groups for anionic permeability.

In references to a tape herein, what is meant is a structure having two dimensions which are very large in relation to the third dimension, such as a sheet, the width and length of which are very much greater than the thickness. The width of the tape, furthermore, is usually desirably small in relation to its length.

Coatings may be provided on the web forming the base of the separator base. These coatings may comprise, for example, materials which promote rapid wetting of the base by aqueous electrolyte solutions. For example, they may comprise the hydrophilic cellulose derivatives mentioned above, such as carboxymethyl cellulose, hydroxyethyl cellulose, and the like. The inclusion of surface active agents may be advantageous. Thus for example, the tape may carry a coating including an anionic surface active agent such as an alkyl aryl sulfonate like dodecylbenzenesulfonate sodium salt, or a sulfated alcohol such as the lauryl sodium sulfate. Synthetic resins of the urea-formaldehyde and melamine-formaldehyde type are desirably present in paper compositions to promote wet strength without appreciable sacrifice in absorbency. In general a size-free paper is desirable, to maximize absorbency. Fillers such as clay- chalk, or other metallic oxides or salts may or may not be present.

Coatings carried by the tape base may further advantageously include one or more fuel cell reaction components.

The weight of reactants applied per area of tape surface will vary depending on the intended current drain. Surprisingly small amounts are needed. For example, using a one-inch width tape, five amperes can be generated with a tape draw rate of 1 inch per minute by a layer of magnesium only .0024 centimeter thick. With the same rate of draw and current drain, the weight of hydrazine consumed will be only .0249 gram per inch; the weight of nitric acid consumed will be only .0391 gram per inch, and so forth.

Metallic coatings may be applied to the base by a variety of methods, to provide a consumable anode material. A base may be sputter-coated with a metal like magnesium or zinc, or it may be laminated to a metal foil such as aluminum foil, using hide glue, ethyl cellulose, or like adhesives. Metallic coatings on the tape maye also comprise catalytically active electrode materials such as platinum, paladium, or the like, applied by means such as those above mentioned.

Coatings on the tape may also comprise dry solid electrochemical reaction components, other than the consumable anode metals, such as powdered fuels, oxidants and electrolytes which are solid at room temperature, fibers, and active electrode materials such as conductive carbon. Application of such dry solids to a tape base can conveniently be effected by means conventional in the art for coating paper, such as mixing the dry solid with an adhesive solution and applying it to the paper base surface. The adhesive employed, for example, may conveniently be a starch solution, (prepared by solubilizing the starch with an acid, heat or enzyme treatment), optionally mixed with a humectant such as glycerine, or it may be a synthetic polymer, such as polyvinyl alcohol, polyvinyl formal, carboxylmethyl cellulose, polyvinylpyrrolidone or the like.

Liquid or gaseous fuel cell reaction components carried by the dry tape will be enclosed in cell walls, with the cell walls being formed of polymeric material. Methods of adhering polymeric materials to bases such as paper tapes are readily available. For example, adhesives may be used or the polymeric material may be contacted with the paper while it is fluidized by being heated above its melting point or wet with a solvent or fluid swelling agent. Polymers which may be used to form the walls of the cells enclosing the fluid carried by the tape may comprise, for example, flexible thermoplastics such as polyvinyl chloride, polyethylene, polymers of tetrafluoro- and chlorotrifluoroethylene, polyvinyl acetate, and so forth, or a film-forming polymeric material of natural origin which is a hydrophilic colloid such as gum arabic, gelatin or the like. Means employed to produce enclosure, of fluids in a closed cell plastic wall can be, for example, forming a tube of the polymeric material, into the hollow center of which the fluid is loaded; bubbling gas into or dispersing a liquid into a fluid melt of the polymer, or the like. Microcapsules of liquid are conveniently produced by suspending the liquid in a fluid medium with which it is immiscible, and in which a film forming material is dissolved. Thus for example, dinitrobenzene may be dispersed in water containing dissolved hydrophilic colloids such as gum arabic and gelatin. The immiscible liquid is agitated in the fluid medium to form tiny droplets coated by the fluid medium, and then the film-forming material is caused to solidify, producing enclosure of the liquid in walls of the solidified, film-forming polymer. Colloids such as gum arabic and gelatin are coactivated by means such as changing the temperature or pH of the medium. The resulting suspension of encapsulated liquid can then be coated onto a surface such as paper, to which it will adhere on drying, forming a coating of pressure-rupturable, fluid-containing capsules.

Polymeric coatings may also be provided on solid reactants adhere to the tape surface, using for example a water soluble polymer like polyvinyl alcohol to adhere a powder to the tape surface, providing it also with a protective coating removable exposure to aqueous media at the time of use.

The coatings comprising fuel cell reaction components will be suitably applied to the tape so that in use, the tape base will be wetted by an aqueous solution of electrolyte, fuel will be provided on one face of the base at the anode and in contact with the electrolyte solution, and oxidant will be provided on the opposite face, contacting the cathode, and in contact with the electrolyte solution. Thus for example, the tape may be provided with a plurality of coatings, such as a face of magnesium on a paper base coated on the opposite face with a first layer of dry ammonium bromide and a second layer upon this of microcapsules comprising dinitrobenzene and water, disposed so that pressure ruptures the capsules permitting the solution to wet the ammonium bromide, which then soaks into the paper base to provide an aqueous solution of ammonium bromide wetting the magnesium face. Separate layers, however, will often not be essential: for example, the electrolyte and oxidant may be mixed in a single layer, usually, and so forth.

The fuel cells in which the separator tapes of the invention are employed may comprise any suitable current collectors as the material leading to the point where the electrodes are placed in electrical contact through the tape separator. Where the current collectors comprise the electrodes, they are desirably not only conductive materials but also adsorb the reactants employed, and act as catalyst for the electrode reactions. Suitable current collector and electrode materials include conductive carbon and copper, noble metals such as platinum, palladium, iridium, rhodium and the like, transition metals such as nickel, and so forth. The electrode surface can advantageously be activated, by deposition of a porous material such as platinum or palladium black, which can be deposited if desired on plates of metals such as stainless steel, iron or the like to form the electrode. Metal oxides such as oxides of iron, magnesium, cobalt, copper and the like may also be used as activating electrode surfaces. The electrode materials may be used in sheet form or in the form of screens, meshes or other types of porous bodies, or as rollers, rings, or like configuations.

As will be apparent from the foregoing discussion, any of a wide variety of fuels, electrolytes and oxidants may be employed in fuel cells embodying a mobile tape separator in accordance with this invention. Descriptions of useful fuel cell reaction components are extensively available in published literature.

The fuel, for example, is sometimes a metal, and in this connection, metals which may be employed as consumable anodes include for example the alkali metals such as lithium, sodium, potassium, Group I–A metals such as copper and silver, Group II metals such as magnesium, calcium, strontium, zinc and cadmium, Group III metals such as aluminum, Group IV metals such as tin, and so forth. The metals may be used individually or in mixtures such as the amalgam of sodium with mercury and the like. Gaseous reductants include for example hydrogen, natural and manufactured gas, light hydrocarbons such as propane and butane, inorganic gases such as ammonia, and so forth. Liquid and solid organic and inorganic fuels, including compounds such as methanol, formaldehyde, formic acid, hydrazine, urea, guanidine and the like, generally have the advantage of being relatively cheap and easy to handle, more reactive than hydrocarbons, and soluble in the electrolyte solution, and form an especially preferred class for convenient utilization.

On the oxidant side, air and oxygen are among the most generally studied gaseous anode feed materials. Oxygen carriers such as hydrogen peroxide and various oxides and oxy acids (reducible compounds having one or more oxygen atoms, including peroxides) are also useful. Exemplary of such acids are nitric, sulfuric and persulfuric acids. Illustrative of inorganic oxides which may be employed are gases like $NO_2$ and $SO_2$, and salts such as sodium peroxide, potassium peroxide, vanadium pentoxide, manganese dioxide, and the like. Also included in this group are salts of oxy acids such as sodium, potassium, lithium, barium, magnesium or calcium chromates, perchlorates, permanganates, and the like. Organic oxidants can also be employed as oxygen carriers for the cathode feed and in this connection, advantageous because of the high electron exchange number involved in their reduction are nitro compounds such as nitrobenzene, meta-dinitrobenzene, 2-chloro-5-nitropyridine, 4-nitropyridine-N-oxide, 8-nitroquinoline, p-nitrophenol, tetranitromethane and the like, as well as nitroso compounds such as p-nitrosodiethylaniline, sodium p-nitrosophenolate and the like. Halogens and halogenated compounds can also be used instead of oxygen-carrying compounds, as cathode feed materials. These may be gaseous halogens, such as bromine, fluorine and so forth, or organically bound halogen, as provided by compounds such as N,N′-dibromodimethylhydantoin, N,N′-dichlorodimethylhydantoin, N,N-dichloro-p-toluenesulfonamide, 2-chloronitropropane, and the like.

Electrolytic connection between the anode and cathode of fuel cells operating at relatively low temperatures such as about 100° C. or below is generally provided by an aqueous solution of an ionizing compound, which may be basic, such as 40% KOH, or acidic, such as 7 molar sulfuric acid, or neutral, such as 1 molar sodium sulfate, 2 molar ammonium or magnesium bromide and the like. Sometimes a solution is both reactant and electrolyte, as is the case for example, with aqueous nitric acid used as an oxidant. The electrolyte solvent may be an ionizing liquid other than an aqueous solution, such as liquid ammonia or salt fluxes, or an organic solvent such as methyl formate, dimethyl formamide, methanol, acrylonitrile or the like. Fixed electrolyte, in the form of a hydrated ion exchange membrane, can also be employed, as in the hydrogen/oxygen cell. The invention can also be applied to thermal cell electrochemical systems, in which a solid salt or mixture of salts is melted at elevated temperatures, above 100° C., to produce electrolytic connection between the anode and cathode.

While the invention has been described with reference to various particular preferred embodiments thereof, it is to be understood that variations and modifications can be made without departing from the scope of the present invention, whcih is limited only as defined in the following claims.

What is claimed is:

1. The method of generating electricity in a fuel cell wherein said cell comprises anode and cathode current collectors, fuel cell electrochemical reaction components comprising electrolyte, fuel, oxidant and active anode and cathode materials, active electrode sites from which said collectors convey an electrical current to an external electrical circuit and a mobile separator comprising a body of electrolytically permeable material driven by electric motor means, said method comprising
    (a) moving said separator past said active electrode sites by said electric motor means; and
    (b) driving said electric motor means by part of the power output from said fuel cell while supplying fuel, oxidant and electrolyte at the active electrode sites.

2. The method of generating electricity in a fuel cell wherein said cell comprises anode and cathode current collectors, fuel cell electrochemical reaction components comprising electrolyte, fuel oxidant and active anode and cathode materials, active electrode sites from which said collectors convey an electrical current to an external electrical circuit and a mobile separator comprising a body of electrolytically permeable material driven by electric motor means, said method comprising the steps of:
    (a) moving said separator past said active electrode sites by said electric motor means; and
    (b) driving said electric motor means by a separate power source having a power output smaller than that of said fuel cell while supplying fuel, oxidant and electrolyte at the active electrode sites.

3. The method of claim 2 wherein the power output of the separate power source is produced in intermittent pulses, and the separator is moved only during the duration of the pulses.

4. The method of claim 2 wherein the power output of the fuel cell is a function of the intensity of said separate power source.

5. The method of claim 2 wherein the power output of the separate power source varies in magnitude, and the electric motor is a variable speed motor which moves the separator faster when it is driven by a power output of greater magnitude.

6. The method of claim 2 wherein the separator is moved initially by separate power source driving the motor, and subsequently the motor is driven by part of the power output of the fuel cell.

7. The method of claim 2 in which the separate power source is the sole power source for the electric motor moving the separator.

8. The method of claim 2 wherein the power output of the fuel cell is used to operate equipment transmitting information about the power output of the separate power source.

9. The method of claim 1 in which the separator carries an anode metal, an oxidant, an active cathode material and electrolyte past said current collectors, supplying fuel, oxidant and electrolyte at the active electrode sites.

References Cited

UNITED STATES PATENTS

| | | | |
|---|---|---|---|
| 3,260,620 | 7/1966 | Gruber | 136—6 |
| 2,925,455 | 2/1960 | Eidensohn et al. | 136—86 |

WINSTON A. DOUGLAS, *Primary Examiner.*

A. SKAPARS, *Assistant Examiner.*

U.S. Cl. X.R.

136—83, 90